J. B. Crosby,
Raisin Seeder.

Nº 56,721. Patented July 31, 1866.

Witnesses:

Inventor:
J. B. Crosby

UNITED STATES PATENT OFFICE.

J. B. CROSBY, OF BOSTON, MASSACHUSETTS.

IMPROVED RAISIN-SEEDER.

Specification forming part of Letters Patent No. 56,721, dated July 31, 1866.

*To all whom it may concern:*

Be it known that I, J. B. CROSBY, of Boston, in the county of Suffolk and State of Massachusetts, have invented a machine for removing the seeds from raisins and other similar dried fruit; and I do hereby declare that the following, taken in connection with the drawings which accompany and form part of this specification, is a description of my invention sufficient to enable those skilled in the art to practice it.

This machine or apparatus operates by impaling the fruit by or upon a number of wires placed so closely together that while the pulp of the fruit is forced upon the wires the seeds, being hard and of too great size to enter the spaces between the wires, remain at the projecting ends or points thereof, and are thus thrust through the skin of the fruit, which breaks to allow their exit. The seeds then remaining at the wire ends and beyond the body of the impaled fruit are removed, after which the impaled pulp is taken off from the wires.

Figure 1:
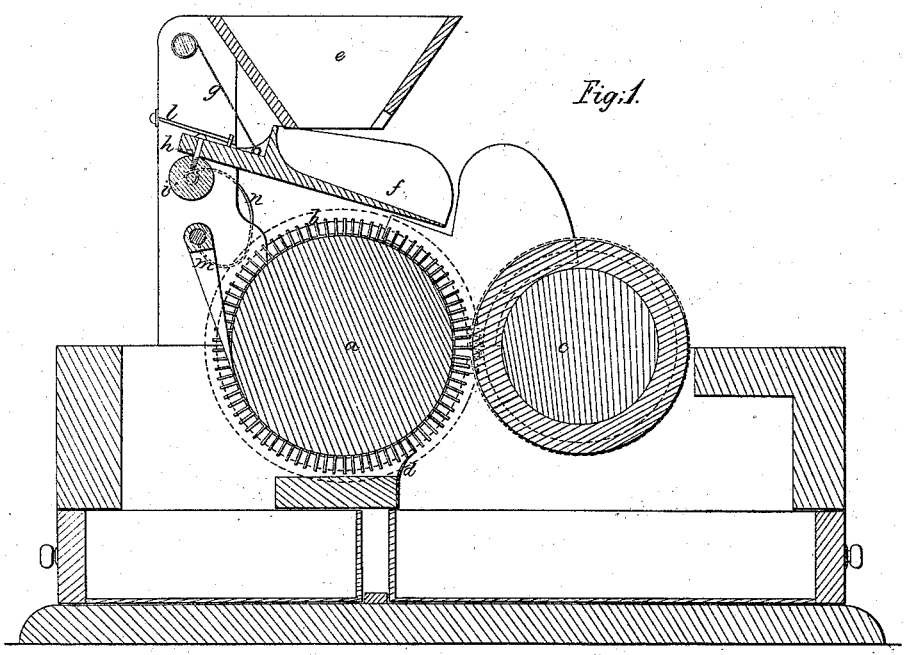
Figure 2:
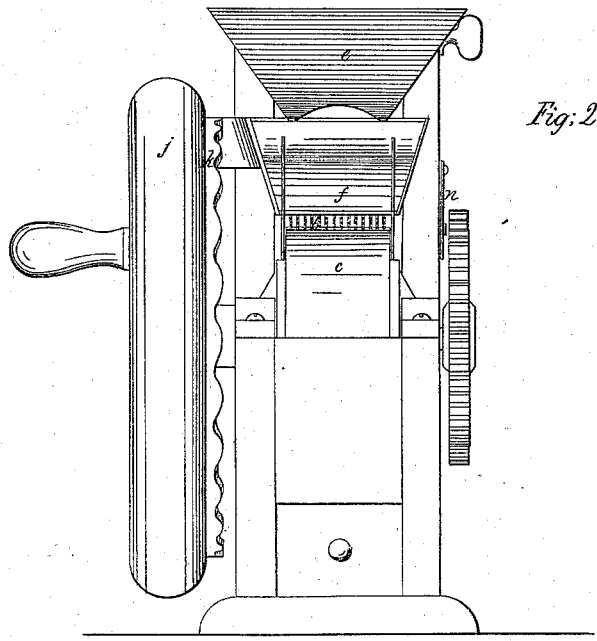

Figure 1 of the drawings shows, in vertical longitudinal central section, a machine embodying this invention; and Fig. 2 shows an end view of the same.

In the cylinder or roll $a$ are set the impaling-wires $b$, the ends thereof, in the rotation of $a$, impinging upon and slightly embedding in the surface of the cylinder or roll $c$, covered or composed of elastic material, preferably vulcanized rubber, the roll $c$ being provided with means by which it can be adjusted toward and from the cylinder $a$, so that the ends of the wires may by proper adjustment of the cylinder $c$ just puncture through the skin of the fruit.

In the operation of the machine the rolls $a$ and $c$ turn toward each other at the same surface velocity by the impact of the wires with the surface of roll $c$. To guard against tearing the fruit by failure of the two cylinders to revolve at about the same surface speed, the rolls are geared together, as shown most clearly in Fig. 2.

The machine being operated so as to cause the rolls $a$ and $c$ to turn toward each other, and raisins being presented to the action of the two rolls, they are seized in the bite thereof and are forced by the bed or soft-surfaced roll $c$ upon the wires $b$; but the seeds remain at the ends of the wires and embed into the soft surface of the roll $c$. In the continued rotation of the rolls the seeds remain at the wire ends till removed by contact with the scraper $d$, which extends across the cylinder $a$, just clearing the ends of its wires $b$.

The raisins may be supplied by hand, or a suitable hopper may be arranged to supply from a quantity placed therein the regular and proper number of raisins suited to the capacity of the machine.

The hopper is marked $e$, and its shaking discharging bottom and spout $f$. The angle at which the bottom $f$ is set and by which the discharge of the fruit is regulated can be varied by means of the adjusting-cord $g$, the bottom $f$ being pivoted at $h$ to a rock-shaft, $i$.

The hand-wheel $j$, by which the machine is operated, is provided with a cam, $k$, acting on a projection from $f$, so that in connection with the counteracting-spring $l$ a sufficient side shake or vibration is given the bottom $f$ to supply raisins to the action of the machine dropping them into the bite of the rolls.

The wires are arranged at uniform distances apart and in regular rows around the cylinder $a$, and between these rows are set a series of strippers, $m$, which, as the cylinder $a$ revolves, wedge off and remove the impaled pulp from the wires, the pulp falling into a suitable receptacle placed to receive it. The series of strippers is kept in place with the points thereof close in contact with the body of the cylinder by the spring $n$, the series turning with the shaft on which they are mounted, and it is advisable to have slight grooves turned in the surface of the cylinder $a$ to receive and steady the points of the strippers.

I claim—

1. The employment of closely-set wires, in combination with a bed or presser, for the purpose of forcing out of raisins or similar dried fruit the seeds or stones thereof by the impalement of the pulp of the fruit on the wires, as specified.

2. The combination, with the above, of a seed-remover or a pulp-remover, or both, arranged to operate substantially as set forth.

J. B. CROSBY.

Witnesses:
S. B. KIDDER,
M. W. FROTHINGHAM.